United States Patent
Ishiyama

(10) Patent No.: US 12,158,293 B2
(45) Date of Patent: Dec. 3, 2024

(54) REFRIGERATION CYCLE APPARATUS

(71) Applicant: Mitsubishi Electric Corporation, Tokyo (JP)

(72) Inventor: Hiroki Ishiyama, Tokyo (JP)

(73) Assignee: Mitsubishi Electric Corporation, Tokyo (JP)

( * ) Notice: Subject to any disclaimer, the term of this patent is extended or adjusted under 35 U.S.C. 154(b) by 222 days.

(21) Appl. No.: 17/922,025

(22) PCT Filed: Jun. 23, 2020

(86) PCT No.: PCT/JP2020/024633
§ 371 (c)(1),
(2) Date: Oct. 28, 2022

(87) PCT Pub. No.: WO2021/260804
PCT Pub. Date: Dec. 30, 2021

(65) Prior Publication Data
US 2023/0175748 A1    Jun. 8, 2023

(51) Int. Cl.
*F25B 49/02* (2006.01)
*F25B 5/02* (2006.01)
(Continued)

(52) U.S. Cl.
CPC ................ *F25B 41/20* (2021.01); *F25B 5/02* (2013.01); *F25B 41/30* (2021.01); *F25B 49/022* (2013.01);
(Continued)

(58) Field of Classification Search
CPC .......... F25B 5/02; F25B 13/00; F25B 49/022; F25B 2313/0233; F25B 2313/0292; F25B 2500/16; F25B 2600/01; F25B 2600/0253
See application file for complete search history.

(56) References Cited

U.S. PATENT DOCUMENTS

2006/0179855 A1*  8/2006  Lifson ..................... F25B 13/00
62/160

FOREIGN PATENT DOCUMENTS

JP    63-129258 A    6/1988
JP    5-203296 A    8/1993
(Continued)

OTHER PUBLICATIONS

International Search Report of the International Searching Authority mailed Sep. 1, 2020 for the corresponding international application No. PCT/JP2020/024633 (and English translation).

*Primary Examiner* — Jonathan Bradford
(74) *Attorney, Agent, or Firm* — Posz Law Group, PLC

(57) ABSTRACT

The refrigerant circulation direction is switched between first and second circulation directions. In the first circulation direction, the refrigerant is circulated in order of a first heat exchanger, a compressor, a second heat exchanger, and a first decompressor, and circulated in order of the first heat exchanger, the compressor, a third heat exchanger, and a second decompressor. A controller identifies a specific heat exchanger from among the second heat exchanger and the third heat exchanger. When an elapsed time from activation of the compressor is shorter than a reference time, the controller makes an opening degree of a specific decompressor that communicates with the specific heat exchanger larger than an opening degree of the decompressor that is among the first decompressor and the second decompressor and different from the specific decompressor, and sets the refrigerant circulation direction to the second circulation direction opposite to the first circulation.

4 Claims, 14 Drawing Sheets

(51) Int. Cl.
    *F25B 13/00*        (2006.01)
    *F25B 41/20*        (2021.01)
    *F25B 41/30*        (2021.01)

(52) U.S. Cl.
    CPC ....... *F25B 13/00* (2013.01); *F25B 2313/0233* (2013.01); *F25B 2313/0292* (2013.01); *F25B 2500/16* (2013.01); *F25B 2500/28* (2013.01); *F25B 2600/01* (2013.01); *F25B 2600/0253* (2013.01); *F25B 2600/2513* (2013.01)

(56) References Cited

FOREIGN PATENT DOCUMENTS

| | | |
|---|---|---|
| JP | 2002-147879 A | 5/2002 |
| JP | 2005-140433 A | 6/2005 |
| JP | 2009-144940 A | 7/2009 |
| JP | 2012-102927 A | 5/2012 |

* cited by examiner

10

REFRIGERATION CYCLE APPARATUS

CROSS REFERENCE TO RELATED APPLICATION

This application is a U.S. national stage application of PCT/JP2020/024633 filed on Jun. 23, 2020, the contents of which are incorporated herein by reference.

TECHNICAL FIELD

The present disclosure relates to a refrigeration cycle apparatus having a function of preventing refrigerant in liquid state (liquid refrigerant) from being sucked into a compressor.

BACKGROUND ART

A conventional refrigeration cycle apparatus having a function of preventing liquid refrigerant from being sucked into a compressor (liquid back) has been known. For example, Japanese Patent Laying-Open No. 2009-144940 (PTL 1) discloses a heat pump air conditioner in which a compressor is activated in a refrigeration cycle that is set to a heating cycle and, when a prescribed condition is satisfied, the refrigeration cycle is switched to a cooling cycle to start cooling operation. This air conditioner can transport refrigerant in liquid state (liquid refrigerant) stored in an indoor unit, from the indoor unit to an outdoor unit through the heating cycle. As a result, the liquid back upon activation of the compressor can be avoided, and the compressor can be protected from the liquid back.

CITATION LIST

Patent Literature

PTL 1: Japanese Patent Laying-Open No. 2009-144940

SUMMARY OF INVENTION

Technical Problem

In the air conditioner disclosed in PTL 1, the heating cycle is carried out when cooling operation is started, and therefore, heat is discharged from the indoor unit for some time after activation of the compressor, in spite of the fact that the ongoing operation is cooling operation. Air warmed by this heat is thus blown from the indoor unit in the cooling operation, against the user's request, and therefore, user's comfort could be degraded. PTL 1, however, does not take into consideration the degradation of user's comfort, caused for preventing the liquid back.

The present disclosure is made to solve the problem as described above, and an object of the present disclosure is to suppress degradation of user's comfort, while improving the stability of the refrigeration cycle apparatus.

Solution to Problem

In a refrigeration cycle apparatus according to the present disclosure, refrigerant is circulated. The refrigeration cycle apparatus includes: a compressor; a first heat exchanger; a second heat exchanger; a third heat exchanger; a first decompressor; a second decompressor; a flow path switch; and a controller. The flow path switch is configured to selectively switch a circulation direction of the refrigerant between a first circulation direction and a second circulation direction opposite to the first circulation direction. The controller is configured to control the compressor, the first decompressor, the second decompressor, and the flow path switch. In the first circulation direction, the refrigerant is circulated in order of the first heat exchanger, the compressor, the second heat exchanger, and the first decompressor, and circulated in order of the first heat exchanger, the compressor, the third heat exchanger, and the second decompressor. The controller is configured to identify a specific heat exchanger among the second heat exchanger and the third heat exchanger. When an elapsed time from activation of the compressor is shorter than a first reference time, the controller is configured to identify, among the first decompressor and the second decompressor, a specific decompressor that communicates with the specific heat exchanger, control the first decompressor and the second decompressor such that an opening degree of the specific decompressor is larger than an opening degree of a decompressor that is among the first decompressor and the second decompressor and different from the specific decompressor, and set the circulation direction of the refrigerant to the second circulation direction.

Advantageous Effects of Invention

The refrigeration cycle apparatus according to the present disclosure can make the opening degree of the specific decompressor larger than the opening degree of the decompressor that is among the first decompressor and the second decompressor and different from the specific decompressor, to thereby suppress degradation of user's comfort, while improving the stability of the refrigeration cycle apparatus.

DESCRIPTION OF EMBODIMENTS

Figure 1:
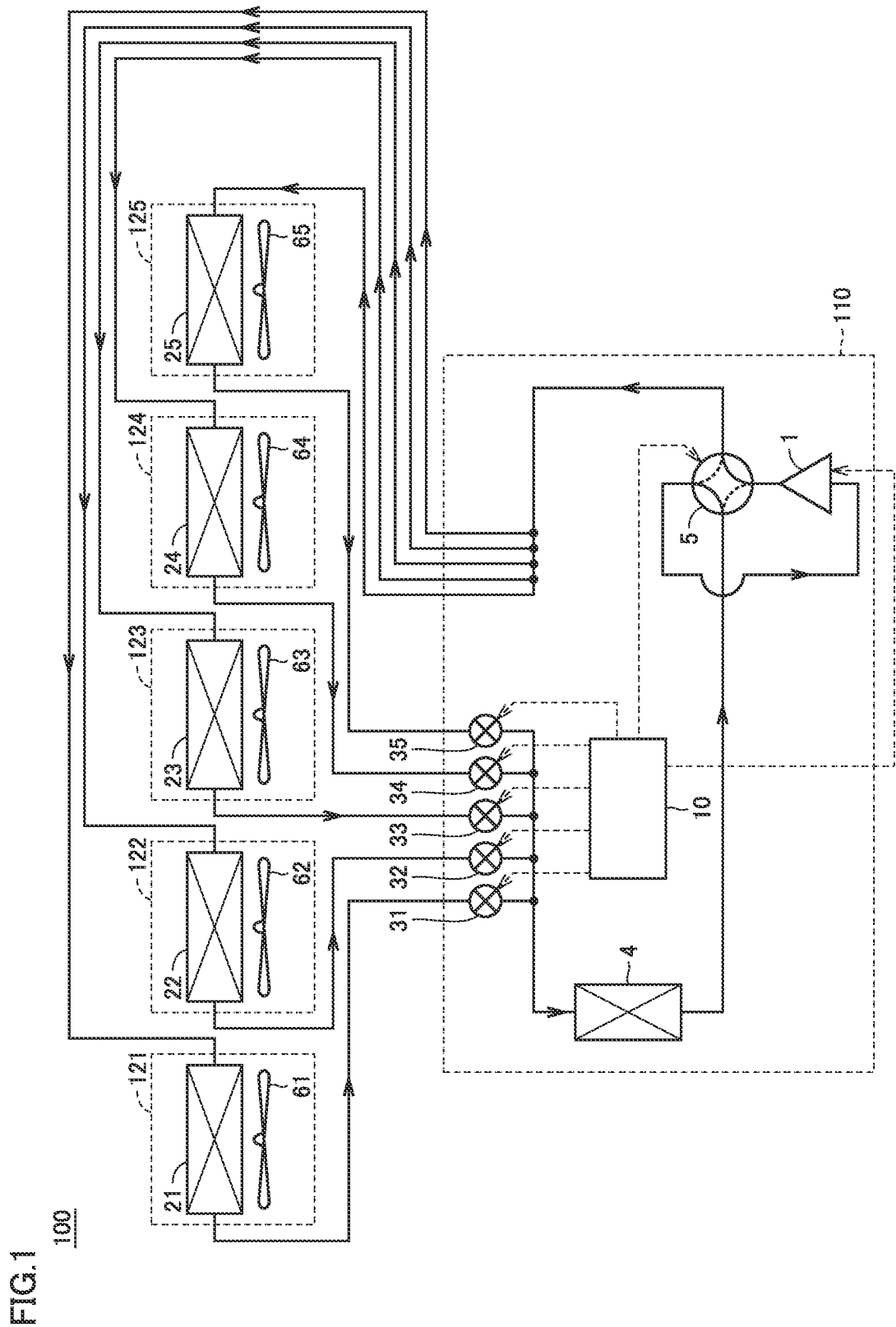
FIG. 1 is a functional block diagram showing a configuration of an air conditioner as an example of a refrigeration cycle apparatus according to Embodiment 1.

Embodiments of the present disclosure are hereinafter described in detail with reference to the drawings. In the drawings, the same or corresponding parts are denoted by the same reference characters, and a description thereof is not herein repeated in principle.

Embodiment 1

FIG. 1 is a functional block diagram showing a configuration of an air conditioner 100 as an example of a refrigeration cycle apparatus according to Embodiment 1. Other examples of the refrigeration cycle apparatus may be a refrigerating machine, or a showcase, for example.

As shown in FIG. 1, air conditioner 100 includes an outdoor unit 110, an indoor unit 121 (first indoor unit), an indoor unit 122 (first indoor unit), an indoor unit 123 (second indoor unit), an indoor unit 124 (second indoor unit), and an indoor unit 125 (second indoor unit). Outdoor unit 110 includes a compressor 1, an outdoor heat exchanger 4 (first heat exchanger), an expansion valve 31 (first decompressor), an expansion valve 32 (first decompressor), an expansion valve 33 (second decompressor), an expansion valve 34 (second decompressor), an expansion valve 35 (second decompressor), a four-way valve 5 (flow path switch), and a controller 10. Expansion valves 31 to 35 communicate with indoor heat exchangers 21 to 25, respectively. Indoor units 121 to 125 include indoor heat exchangers 21 to 25, respectively, as well as fans 61, 62, 63, 64, and 65, respectively. Fans 61, 62, 63, 64, and 65 blow air to indoor heat exchangers 21 to 25, respectively.

Controller 10 controls the drive frequency of compressor 1 to control the amount of refrigerant discharged per unit time from compressor 1. Controller 10 controls the opening degree of each of expansion valves 31 to 35. Controller 10 switches the operation mode of air conditioner 100. The operation mode includes a refrigerant discharge mode and a normal mode. The refrigerant discharge mode is an operation mode for transporting the amount of liquid refrigerant stored in outdoor heat exchanger 4 to any of indoor heat exchangers 21 to 25 to thereby reduce the amount of liquid refrigerant stored in outdoor heat exchanger 4. The normal mode is an operation mode for performing heating operation by indoor units 121 to 125.

Controller 10 controls four-way valve 5 to selectively switch the refrigerant circulation direction between a first circulation direction and a second circulation direction that is the opposite direction to the first circulation direction. FIG. 1 shows the first circulation direction. Four-way valve 5 causes a discharge port of compressor 1 to communicate with each of indoor heat exchangers 21 to 25, and causes outdoor heat exchanger 4 to communicate with a suction port of compressor 1, to thereby set the refrigerant circulation direction to the first circulation direction. In the first circulation direction, refrigerant is circulated in the order of outdoor heat exchanger 4, four-way valve 5, compressor 1, four-way valve 5, indoor heat exchanger 21, and expansion valve 31. Refrigerant is circulated in the order of outdoor heat exchanger 4, four-way valve 5, compressor 1, four-way valve 5, indoor heat exchanger 22, and expansion valve 32. Refrigerant is circulated in the order of outdoor heat exchanger 4, four-way valve 5, compressor 1, four-way valve 5, indoor heat exchanger 23, and expansion valve 33. Refrigerant is circulated in the order of outdoor heat exchanger 4, four-way valve 5, compressor 1, four-way valve 5, indoor heat exchanger 24, and expansion valve 34. Refrigerant is circulated in the order of outdoor heat exchanger 4, four-way valve 5, compressor 1, four-way valve 5, indoor heat exchanger 25, and expansion valve 35. In the first circulation direction, each of indoor heat exchangers 21 to 25 functions as a condenser, and outdoor heat exchanger 4 functions as an evaporator.

Figure 2:
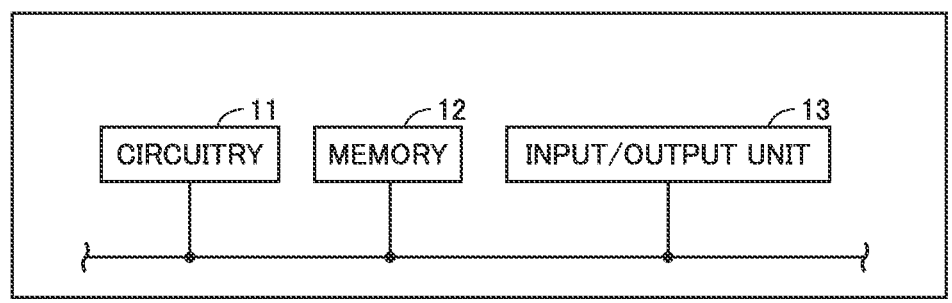
FIG. 2 is a functional block diagram showing a configuration of a controller in FIG. 1.

FIG. 2 is a functional block diagram showing a configuration of controller 10 in FIG. 1. As shown in FIG. 2, controller 10 includes circuitry 11, a memory 12, and an input/output unit 13. Circuitry 11 may be dedicated hardware or a CPU (Central Processing Unit) that executes a program stored in memory 12. When circuitry 11 is dedicated hardware, circuitry 11 is a single circuit, a composite circuit, a programmed processor, a parallel-programmed processor, an ASIC (Application Specific Integrated Circuit), an FPGA (Field Programmable Gate Array), or a combination thereof, for example. When circuitry 11 is a CPU, the functions of controller 10 are implemented by software, firmware, or a combination of software and firmware. The software or firmware is written as a program, and stored in memory 12. Circuitry 11 reads and executes a program stored in memory 12. Memory 12 includes a non-volatile or volatile semiconductor memory (for example, RAM (Random Access Memory), ROM (Read Only Memory), flash memory, EPROM (Erasable Programmable Read Only Memory), or EEPROM (Electrically Erasable Programmable Read Only Memory)), and a magnetic disc, a flexible disc, an optical disc, a compact disc, a mini disc, or a DVD (Digital Versatile Disc). The CPU is also called central processing unit, processing unit, arithmetic unit, microprocessor, microcomputer, processor, or DSP (Digital Signal Processor).

Input/output unit 13 receives operation from a user, and outputs a result of processing to the user. Input/output unit 13 includes a mouse, a keyboard, a touch panel, a display, and a speaker, for example.

Outdoor unit 110 is mostly placed in an outdoor space. When heating operation for an indoor space is required, usually the temperature of the outdoor space has been reduced to a relatively low temperature. Therefore, gaseous refrigerant in outdoor heat exchanger 4 functioning as an evaporator in the heating mode is cooled into liquid by the low-temperature air while air conditioner 100 is stopped. While air conditioner 100 is stopped, the amount of liquid refrigerant stored in outdoor heat exchanger 4 is likely to increase. Therefore, when the heating mode of air conditioner 100 is restarted, the liquid refrigerant may be sucked into compressor 1 from outdoor heat exchanger 4. When such liquid back occurs, the lubricating performance of lubricating oil stored in compressor 1 is degraded, which increases the possibility of failure of compressor 1.

In view of the above, air conditioner 100 temporarily sets the refrigerant circulation direction to the second circulation direction when the heating operation is started, to perform the refrigerant discharge mode for transporting refrigerant stored in outdoor heat exchanger 4 to at least one predetermined indoor heat exchanger among indoor heat exchangers 21 to 25. In air conditioner 100, the at least one predetermined indoor heat exchanger is indoor heat exchanger 21 (specific heat exchanger) and indoor heat exchanger 22 (specific heat exchanger). The refrigerant discharge mode reduces the amount of liquid refrigerant stored in outdoor heat exchanger 4. Therefore, even when the refrigerant circulation direction is switched to the first circulation direction to start the normal mode, liquid back is unlikely to occur. Moreover, indoor heat exchangers each functioning as an evaporator in the refrigerant discharge mode, among indoor heat exchangers 21 to 25, are limited to indoor heat exchangers 21, 22. Accordingly, degradation of user's comfort due to the fact that cooled air is blown from the indoor unit in the heating operation can also be suppressed.

Figure 3:
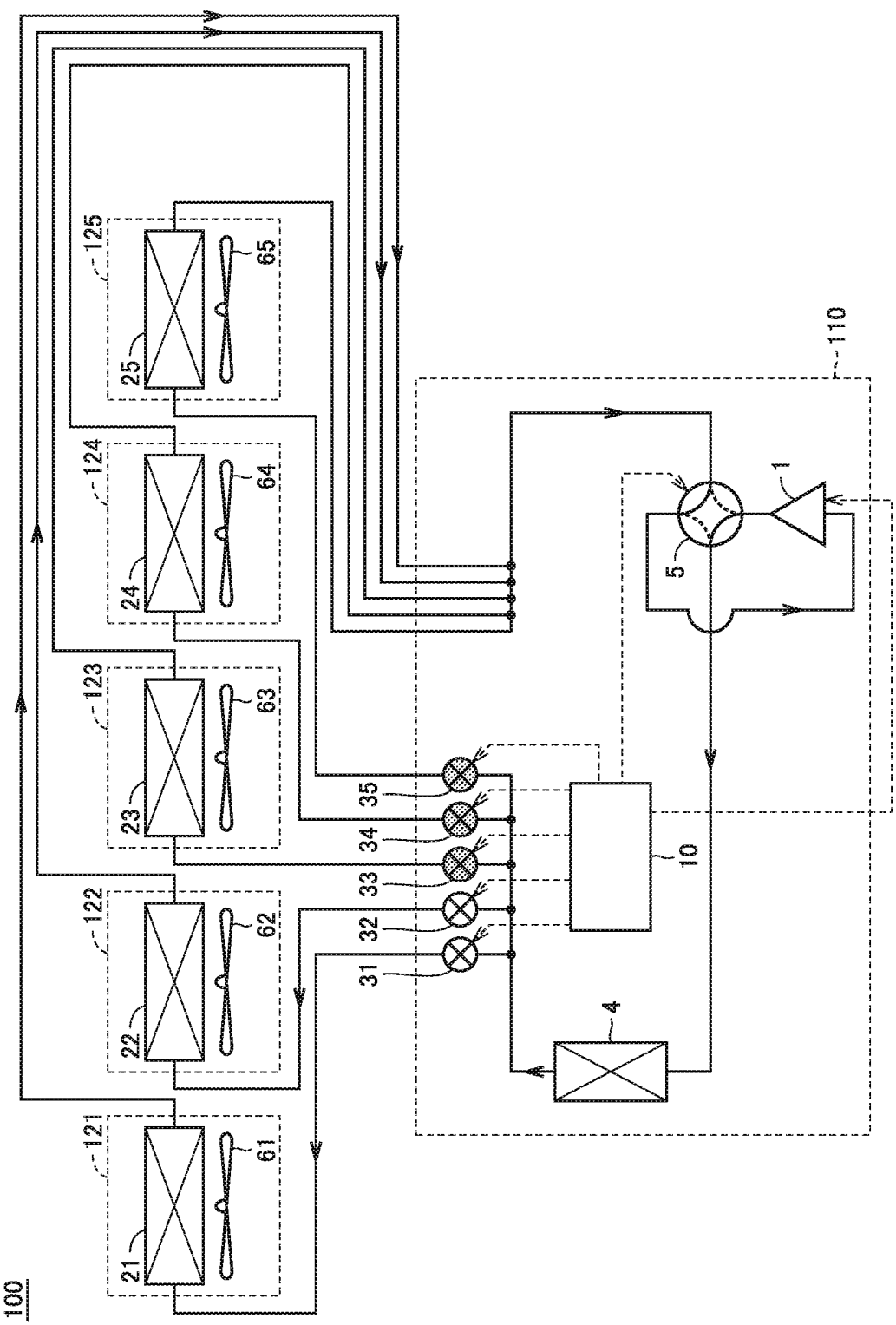
FIG. 3 is a functional block diagram showing a flow of refrigerant when the operation mode of the air conditioner in FIG. 1 is a refrigerant discharge mode.

FIG. 3 is a functional block diagram showing a flow of refrigerant when the operation mode of air conditioner 100 in FIG. 1 is the refrigerant discharge mode. As shown in FIG. 3, controller 10 opens expansion valve 31 (specific decompressor) and expansion valve 32 (specific decompressor) that communicate respectively with indoor heat exchangers 21, 22, closes expansion valves 33 to 35, and controls four-way valve 5 to set the refrigerant circulation direction to the second circulation direction. In the second circulation direction, the refrigerant is circulated in the order of compressor 1, four-way valve 5, outdoor heat exchanger 4, expansion valve 31, indoor heat exchanger 21, and four-way valve 5. The refrigerant is circulated in the order of compressor 1, four-way valve 5, outdoor heat exchanger 4, expansion valve 32, indoor heat exchanger 22, and four-way valve 5. The liquid refrigerant stored in outdoor heat exchanger 4 is transported to indoor heat exchangers 21, 22.

Controller 10 continues the refrigerant discharge mode for a reference time Tr1, and thereafter switches the operation mode from the refrigerant discharge mode to the normal mode. In the normal mode, controller 10 switches the refrigerant circulation direction from the second circulation direction to the first circulation direction, and opens expansion valves 33 to 35 closed during the refrigerant discharge mode.

Figure 4:
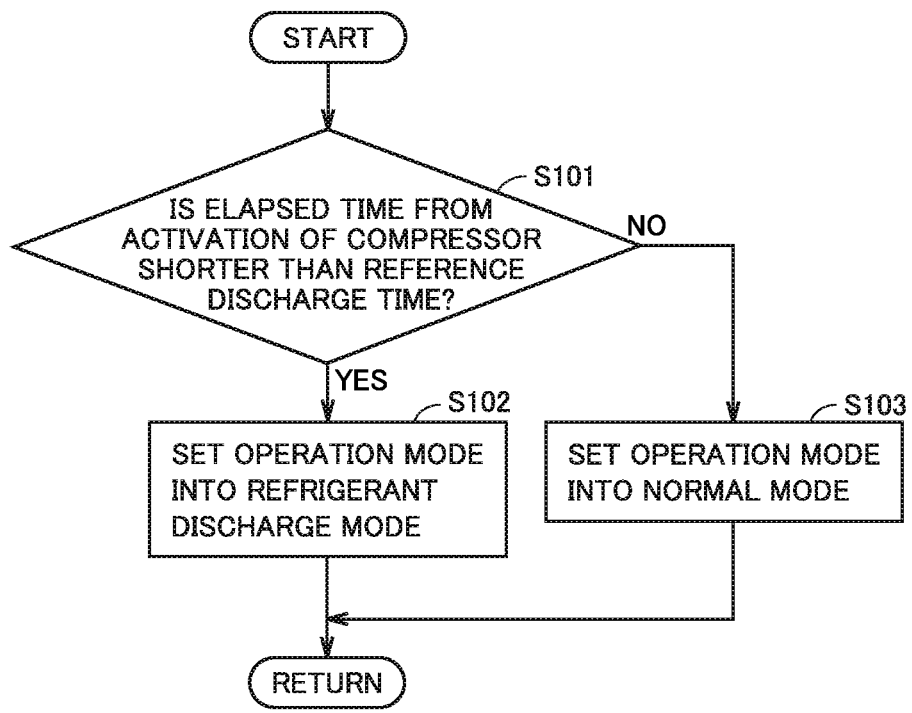
FIG. 4 is a flowchart showing a flow of an operation mode switching process performed by the controller in FIG. 1.

FIG. 4 is a flowchart showing a flow of an operation mode switching process performed by controller 10 in FIG. 1. The process shown in FIG. 4 is followed, for each sampling time, by a main routine (not shown) that exercises overall management of air conditioner 100. In the following, step is abbreviated simply as S.

As shown in FIG. 4, controller 10 determines in S101 whether or not the elapsed time from activation of compressor 1 is shorter than reference time Tr1 (first reference time). When the elapsed time from activation of compressor 1 is shorter than reference time Tr1 (YES in S101), controller 10 sets the operation mode into the refrigerant discharge mode in S102, and returns the process back to the main routine. In S102, controller 10 opens an expansion valve that communicates with a predetermined indoor heat exchanger, and closes an expansion valve that communicates with an indoor heat exchanger other than the predetermined indoor heat exchanger, to set the refrigerant circulation direction to the second circulation direction. When the elapsed time from activation of compressor 1 is longer than or equal to reference time Tr1 (NO in S101), controller 10 sets the operation mode into the normal mode in S103, and returns the process back to the main routine. In S103, controller 10 opens the closed expansion valve to set the refrigerant circulation direction to the first circulation direction. Reference time Tr1 in S101 can be determined appropriately through a real-machine experiment or simulation, as the time required for the amount of refrigerant stored in outdoor heat exchanger 4 to be reduced to the extent that does not cause the liquid back.

In connection with Embodiment 1, the above description is given of the case where the indoor heat exchanger to which liquid refrigerant is to be transported from the outdoor heat exchanger in the refrigerant discharge mode is determined in advance. In connection with Modifications 1 and 2 of Embodiment 1, a description is given below of the case where an indoor heat exchanger to which liquid refrigerant is to be transported from the outdoor heat exchanger is identified in real time at the timing at which the refrigerant discharge mode is performed.

Modification 1 of Embodiment 1

Figure 5:
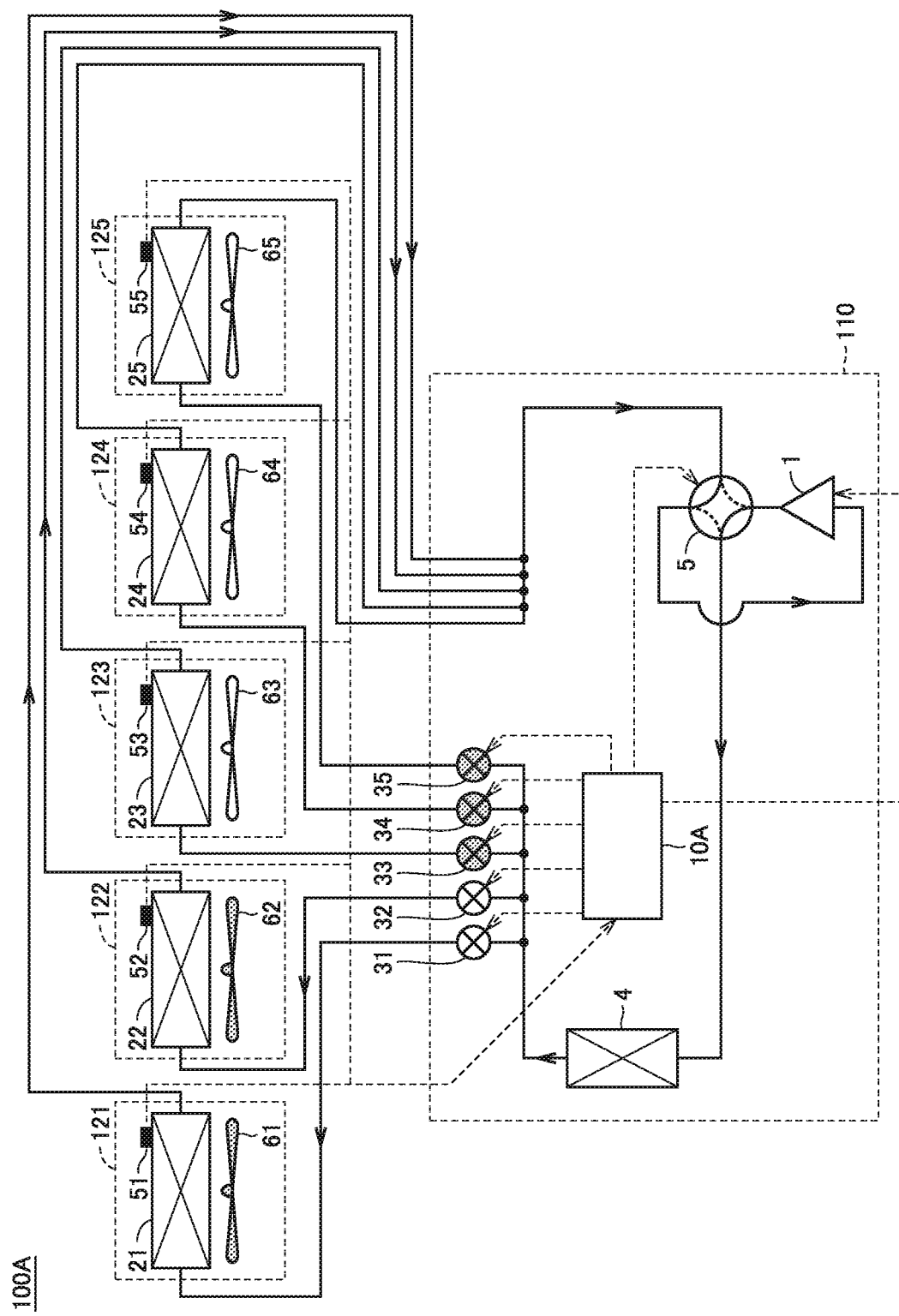
FIG. 5 is a functional block diagram showing a configuration of an air conditioner as an example of a refrigeration cycle apparatus according to Modification 1 of Embodiment 1.

FIG. 5 is a functional block diagram showing a configuration of an air conditioner 100A as an example of a refrigeration cycle apparatus according to Modification 1 of Embodiment 1. In FIG. 5, a flow of refrigerant in the refrigerant discharge mode is shown. The configuration of air conditioner 100A corresponds to the configuration of air conditioner 100 in FIG. 3 to which a sensor 51 (first sensor), a sensor 52 (first sensor), a sensor 53 (second sensor), a sensor 54 (second sensor), and a sensor 55 (second sensor) are added, and in which controller 10 is replaced with a controller 10A. Components other than these components are similar to those in FIG. 3, and therefore, the description thereof is not herein repeated.

As shown in FIG. 5, sensors 51 to 55 are placed in indoor units 121 to 125, respectively. Sensors 51 to 55 detect whether indoor units 121 to 125 are stopped or not, respectively. Sensors 51 to 55 detect, for example, the amount of electricity for indoor units 121 to 125, respectively, or respective states of power switches for indoor units 121 to 125, respectively. Controller 10A uses respective detected values of sensors 51 to 55 to identify a stopped indoor unit among indoor units 121 to 125, and opens the expansion valve that communicates with the identified indoor unit. In FIG. 5, it is determined that indoor units 121, 122 are stopped, and expansion valves 31, 32 that communicate respectively with indoor units 121, 122 are opened. In the refrigerant discharge mode, controller 10A closes the expansion valve that communicates with the operating indoor unit. In FIG. 5, expansion valves 33 to 35 that communicate respectively with operating indoor units 123 to 125 are closed. Controller 10A controls four-way valve 5 to set the refrigerant circulation direction to the second circulation direction.

In air conditioner 100A, the indoor heat exchanger that is to function as an evaporator in the refrigerant discharge mode is limited to the indoor heat exchanger included in the stopped indoor unit. For the stopped indoor unit, a user does not request heating operation, and therefore, even when cooled air is blown from this indoor unit, this goes against user's request only to a slight extent. Thus, degradation of comfort due to cooled air blown from the indoor unit during heating operation can be suppressed to a greater extent than Embodiment 1. If all the indoor units are operating in the refrigerant discharge mode, the liquid refrigerant stored in outdoor heat exchanger 4 is transported to a predetermined indoor heat exchanger similarly to Embodiment 1.

Figure 6:
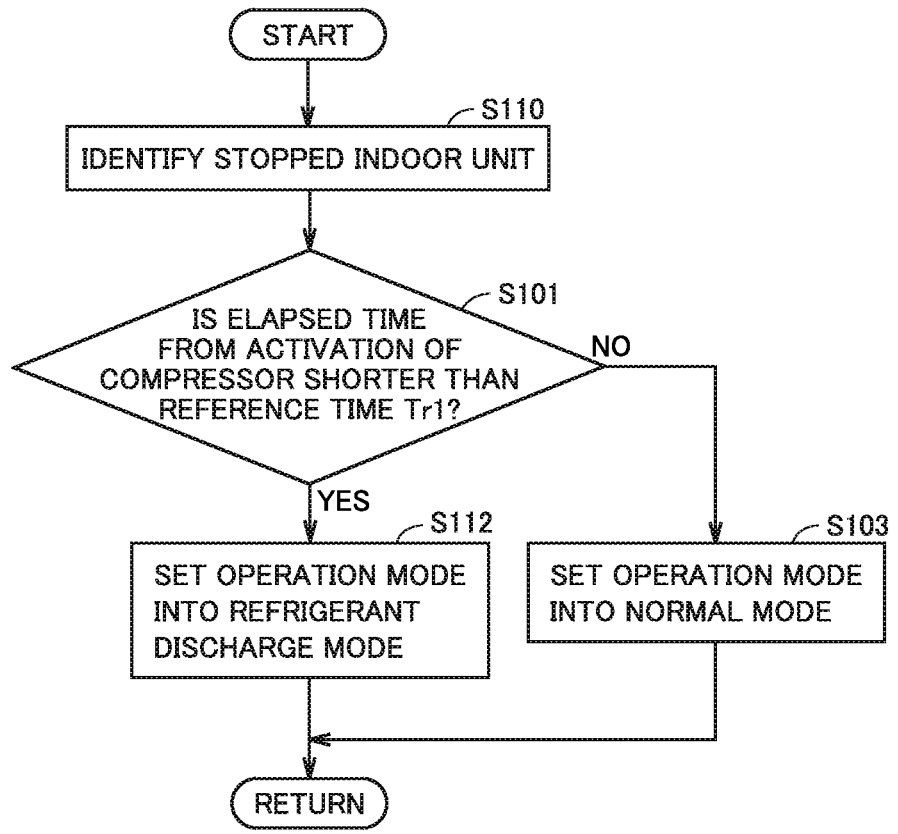
FIG. 6 is a flowchart showing a flow of an operation mode switching process performed by a controller in FIG. 5.

FIG. 6 is a flowchart showing a flow of an operation mode switching process performed by controller 10A in FIG. 5. The process shown in FIG. 6 is followed, for each sampling time, by a main routine (not shown) that exercises overall management of air conditioner 100A. The flowchart shown in FIG. 6 corresponds to the flowchart shown in FIG. 4 to which S110 is added and in which S102 is replaced with S112. Other steps are similar to those in FIG. 4, and therefore, the description thereof is not herein repeated.

As shown in FIG. 6, controller 10A identifies a stopped indoor unit among indoor units 121 to 125 in S110, and makes the process proceed to S101. Controller 10A makes the determination in S101, similarly to Embodiment 1. If NO in S101, controller 10A performs S103 similarly to Embodiment 1, and returns the process back to the main routine. If YES in S101, controller 10A sets the operation mode into the refrigerant discharge mode in S112, and returns the process back to the main routine. In S112, controller 10A opens the expansion valve that communicates with the stopped indoor unit, closes the expansion valve that communicates with the operating indoor unit, and sets the refrigerant circulation direction to the second circulation direction. S110 may be performed prior to S112, if YES in S101.

Modification 2 of Embodiment 1

Figure 7:
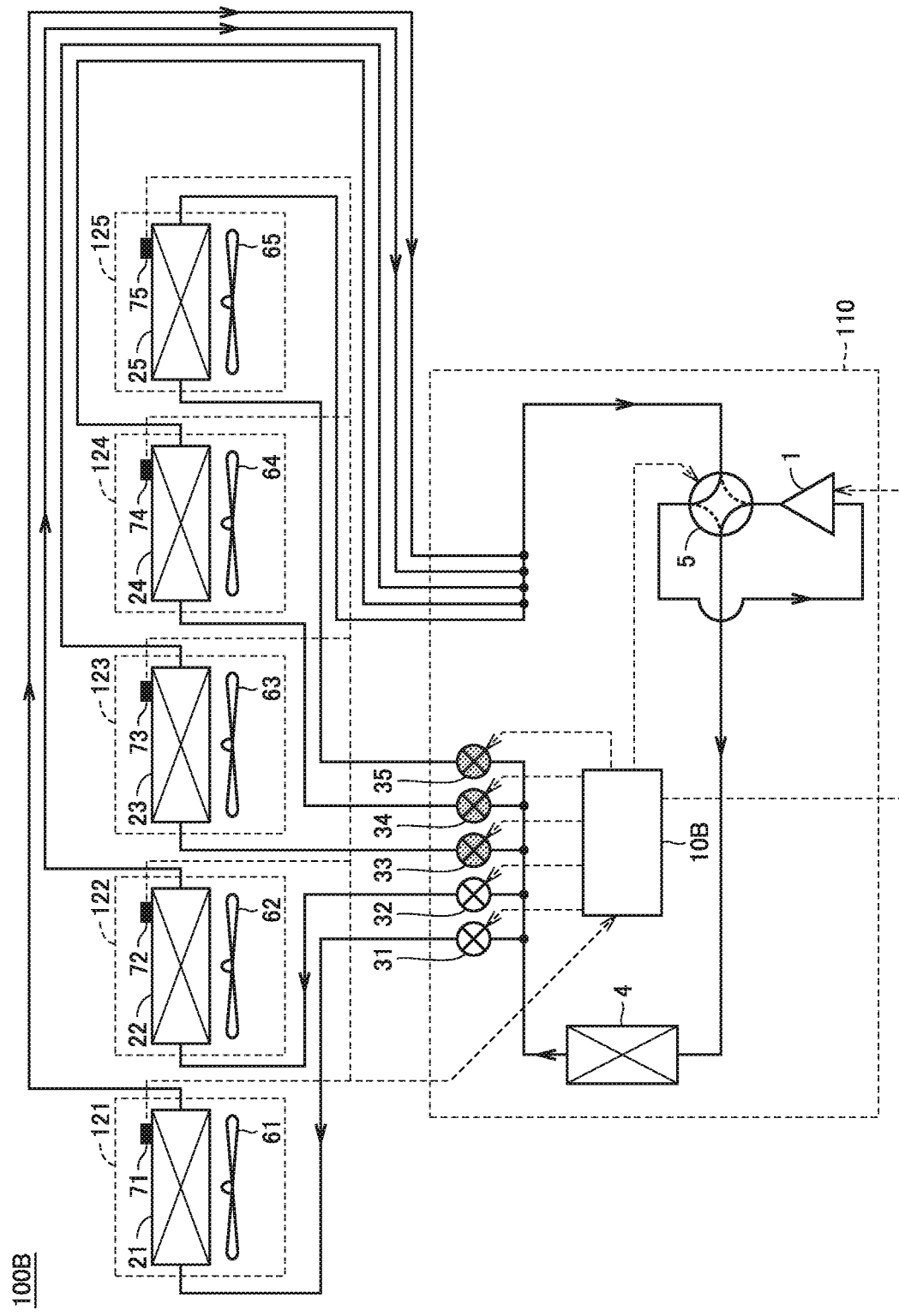
FIG. 7 is a functional block diagram showing a configuration of an air conditioner as an example of a refrigeration cycle apparatus according to Modification 2 of Embodiment 1.

FIG. 7 is a functional block diagram showing a configuration of an air conditioner 100B as an example of a refrigeration cycle apparatus according to Modification 2 of Embodiment 1. In FIG. 7, a flow of refrigerant in the refrigerant discharge mode is shown. The configuration of air conditioner 100B corresponds to the configuration of air conditioner 100 in FIG. 3 to which a motion sensor 71 (first sensor), a motion sensor 72 (first sensor), a motion sensor 73 (second sensor), a motion sensor 74 (second sensor), and a motion sensor 75 (second sensor) are added, and in which controller 10 is replaced with a controller 10B. Components other than these components are similar to those in FIG. 3, and therefore, the description thereof is not herein repeated.

As shown in FIG. 7, motion sensors 71 to 75 are placed in indoor units 121 to 125, respectively. Motion sensors 71 to 75 detect any person located around indoor units 121 to 125, respectively. Motion sensors 71 to 75 include, for example, infrared sensor or ultrasonic sensor. Controller 10B uses respective detected values of motion sensors 71 to 75 to identify an indoor unit around which no person is present, among indoor units 121 to 125, and opens the expansion valve that communicates with the identified indoor unit. In FIG. 7, it is determined that no person is present around indoor units 121, 122, and expansion valves 31, 32 that communicate respectively with indoor units 121, 122 are opened. Controller 10B closes the expansion valve that communicates with the indoor unit around which any person is present. In FIG. 7, it is determined that any person is present around each of indoor units 123 to 125, and expansion valves 33 to 35 that communicate respectively with indoor units 123 to 125 are closed. Controller 10B controls four-way valve 5 to set the refrigerant circulation direction to the second circulation direction.

In air conditioner 100B, the indoor heat exchanger that is to function as an evaporator in the refrigerant discharge mode is limited to the indoor heat exchanger included in the indoor unit around which no person is present. Even when cooled air is blown from the indoor unit around which no person is present, sensing, by a user, of the temperature of the indoor space is hardly influenced. Thus, degradation of user's comfort due to cooled air blown from the indoor unit during heating operation can be suppressed to a greater extent than Embodiment 1. If any person is present around each of all the indoor units in the refrigerant discharge mode, the liquid refrigerant stored in outdoor heat exchanger 4 is transported to a predetermined indoor heat exchanger.

Figure 8:
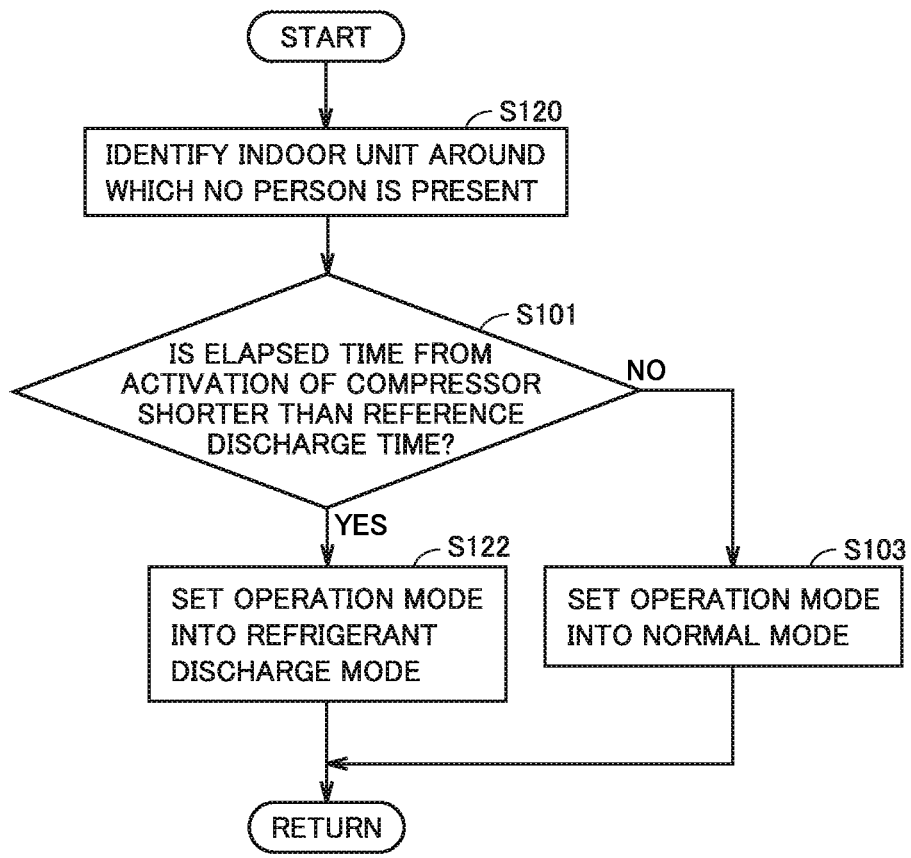
FIG. 8 is a flowchart showing a flow of an operation mode switching process performed by a controller in FIG. 7.

FIG. 8 is a flowchart showing a flow of an operation mode switching process performed by controller 10B in FIG. 7. The process shown in FIG. 8 is followed, for each sampling time, by a main routine (not shown) that exercises overall management of air conditioner 100B. The flowchart shown in FIG. 8 corresponds to the flowchart shown in FIG. 4 to which S120 is added and in which S102 is replaced with S122. Other steps are similar to those in FIG. 4, and therefore, the description thereof is not herein repeated.

As shown in FIG. 8, controller 10B identifies an indoor unit around which no person is present in S120, and makes the process proceed to S101. Controller 10B makes the determination of S101 similarly to Embodiment 1. If NO in S101, controller 10B performs S103 similarly to Embodiment 1, and returns the process back to the main routine. If YES in S101, controller 10B sets the operation mode into the refrigerant discharge mode in S122, and returns the process back to the main routine. In S122, controller 10B opens the expansion valve that communicates with the indoor unit around which no person is present, closes the expansion valve that communicates with the indoor unit around which any person is present, and sets the refrigerant circulation direction to the second circulation direction. S120 may be performed prior to S122, if the determination in S101 is YES.

Thus, the refrigeration cycle apparatuses according to Embodiment 1 and Modifications 1 and 2 thereof can suppress degradation of user's comfort, while improving the stability of the refrigeration cycle apparatuses.

Embodiment 2

In order to prevent failure of a compression mechanism of the compressor, lubricating oil is usually stored in the compressor together with refrigerant. The lubricating oil is discharged together with the refrigerant from the compressor, and therefore, if operation of the compressor is continued, the amount of the lubricating oil stored in the compressor is decreased. As a result, the lubricating performance of the lubricating oil is degraded, the performance of the compressor is degraded, and the possibility of failure of the compressor is increased. Therefore, when the operating time for which the refrigeration cycle apparatus has operated reaches a certain time, it is necessary to perform an operation mode for retrieving the lubricating oil distributed in the refrigeration cycle apparatus back to the compressor (oil retrieval mode). In order to shorten the time required for the oil retrieval mode, the drive frequency of the compressor may be set to a higher drive frequency in the oil retrieval mode than the drive frequency (reference drive frequency) of the compressor in the normal mode. As a result, air warmed excessively against user's request is blown from the indoor unit, and therefore, user's comfort may be degraded. In view of this, a description is given below in connection with Embodiment 2, of a configuration that limits the indoor heat exchangers through which refrigerant is passed in the oil retrieval mode, to suppress degradation of user's comfort while improving the stability of the compressor.

Figure 9:
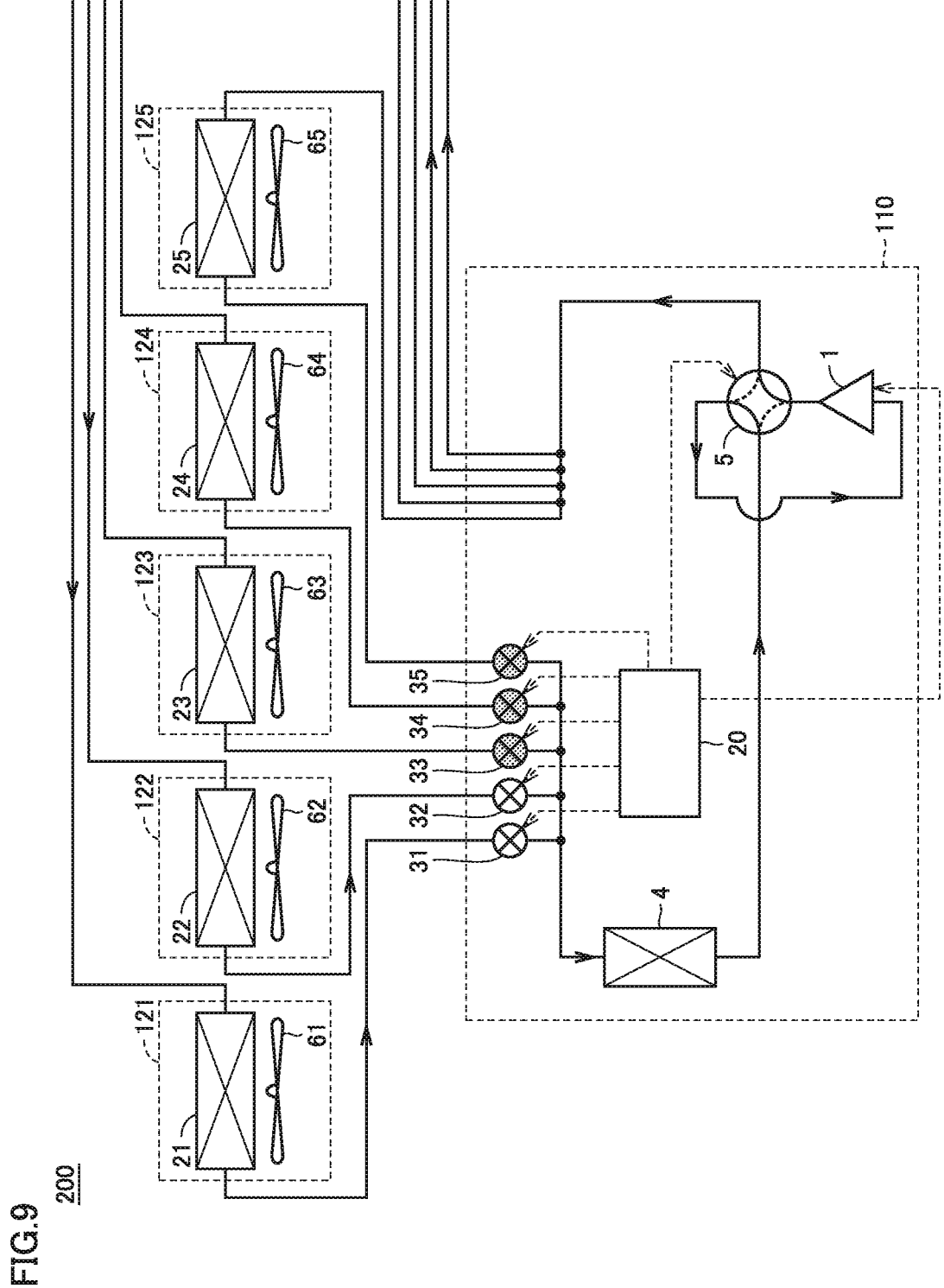
FIG. 9 is a block diagram showing a configuration of an air conditioner as an example of a refrigeration cycle apparatus according to Embodiment 2.

FIG. 9 is a block diagram showing a configuration of an air conditioner 200 as an example of a refrigeration cycle apparatus according to Embodiment 2. The operation mode of air conditioner 200 includes the oil retrieval mode, in addition to the normal mode and the refrigerant discharge mode. In FIG. 9, a flow of refrigerant in the oil retrieval mode is shown. The configuration of air conditioner 200 corresponds to the configuration in FIG. 1 in which controller 10 is replaced with a controller 20. Components other than this are similar to those in FIG. 1, and therefore, the description thereof is not herein repeated.

As shown in FIG. 9, in the oil retrieval mode, controller 20 limits the indoor heat exchanger through which refrigerant is passed, to a predetermined indoor heat exchanger. In FIG. 9, the predetermined heat exchanger is indoor heat exchangers 21, 22. Controller 20 opens expansion valves 31, 32 that communicate respectively with indoor heat exchangers 21, 22, closes expansion valves 33 to 35, controls four-way valve 5 to set the refrigerant circulation direction to the first circulation direction, and increases the drive frequency of compressor 1 to be higher than the reference drive frequency. The oil retrieval mode retrieves a part of the lubricating oil distributed in air conditioner 200 back to compressor 1, and therefore, the stability of compressor 1 can be improved. Moreover, the indoor heat exchanger through which refrigerant is passed in the oil retrieval mode is limited to indoor heat exchangers 21, 22, and therefore, degradation of user's comfort due to blow of excessively warmed air can also be suppressed. Controller 20 performs the refrigerant discharge mode similarly to controller 10 of Embodiment 1.

Figure 10:
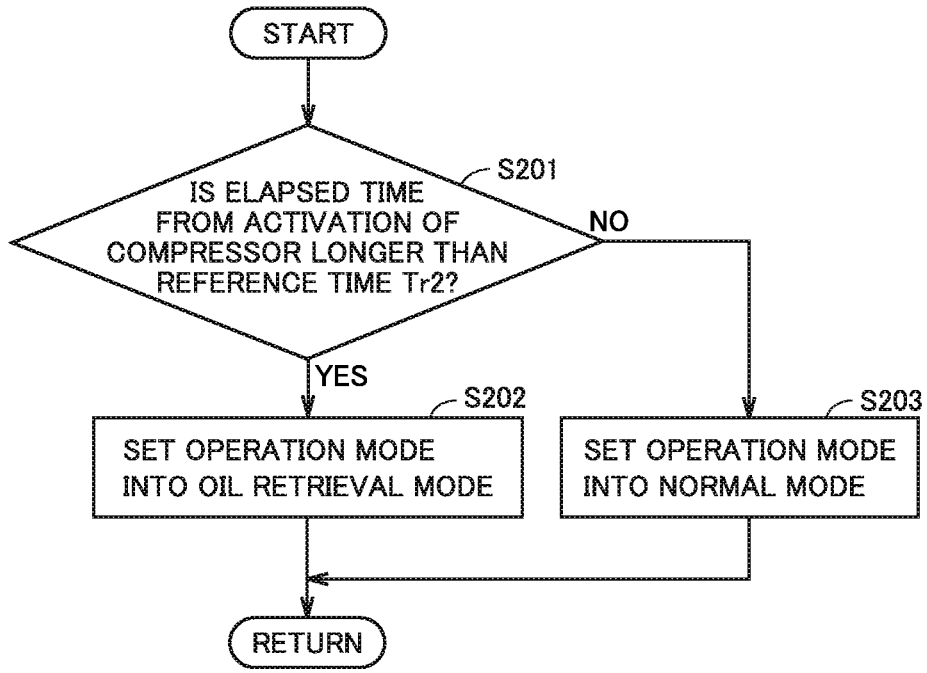
FIG. 10 is a flowchart showing a flow of an operation mode switching process performed by a controller in FIG. 9.

FIG. 10 is a flowchart showing a flow of an operation mode switching process performed by controller 20 in FIG. 9. The process shown in FIG. 10 is followed, for each sampling time, by a main routine (not shown) that exercises overall management of air conditioner 200.

As shown in FIG. 10, controller 20 determines in S201 whether or not the elapsed time from activation of compressor 1 is longer than a reference time Tr2 (second reference time). When the elapsed time from activation of compressor 1 is longer than reference time Tr2 (YES in S201), controller 20 sets the operation mode into the oil retrieval mode in S202, and returns the process back to the main routine. In S202, controller 20 increases the drive frequency of compressor 1 to be higher than the reference drive frequency, opens an expansion valve that communicates with a predetermined indoor heat exchanger, and closes the expansion valve that communicates with the indoor heat exchanger other than the predetermined indoor heat exchanger, to set the refrigerant circulation direction to the first circulation direction. When the elapsed time from activation of compressor 1 is shorter than or equal to reference time Tr2 (NO in S201), controller 20 sets the operation mode into the normal mode in S203, and returns the process back to the main routine. In S203, controller 20 opens the closed expansion valve, and controls the drive frequency of compressor 1 to be adapted to the degree of air conditioning requested by a user. Reference time Tr2 may be determined appropriately through a real-machine experiment or simulation, as the time required for retrieving an amount of lubricating oil that is necessary for maintaining the performance of compressor 1. The reference drive frequency is an average drive frequency that is to be used in the normal mode, for example, and may be determined appropriately through a real-machine experiment or simulation.

Figure 11:
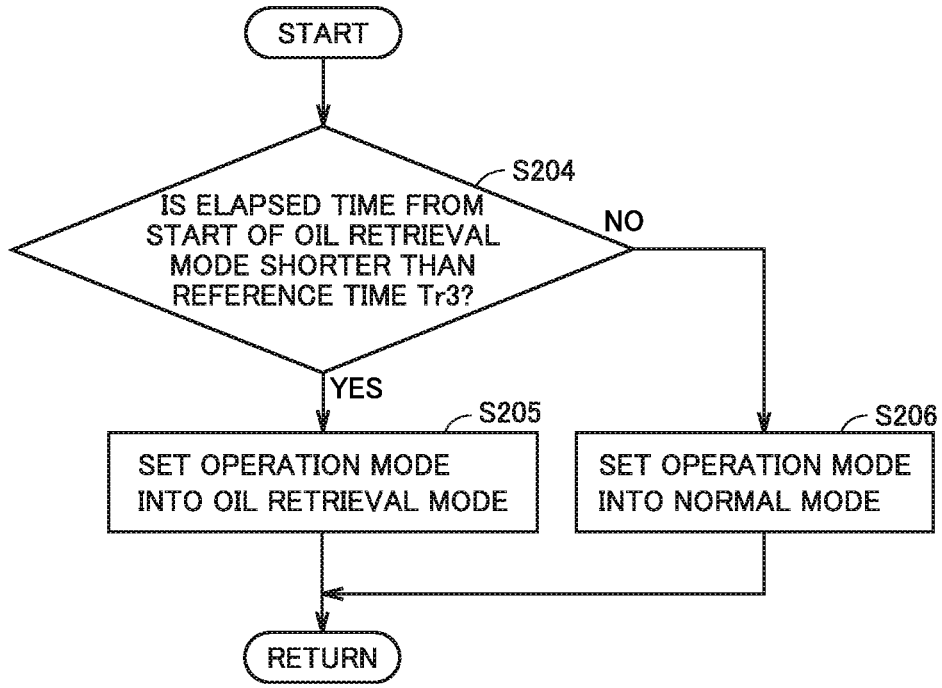
FIG. 11 is a flowchart showing a flow of an operation mode switching process after start of an oil retrieval mode, performed by the controller in FIG. 9.

FIG. 11 is a flowchart showing a flow of an operation mode switching process after the oil retrieval mode is started, performed by controller 20 in FIG. 9. The process shown in FIG. 11 is followed, for each sampling time, by a main routine (not shown) that exercises overall management of air conditioner 200.

As shown in FIG. 11, controller 20 determines in S204 whether or not the elapsed time from the start of the oil retrieval mode is shorter than a reference time Tr3. When the elapsed time from the start of the oil retrieval mode is shorter than reference time Tr3 (YES in S204), controller 20 sets the operation mode into the oil retrieval mode in S205, and returns the process back to the main routine. When the elapsed time from the start of the oil retrieval mode is longer than or equal to reference time Tr3 (NO in S204), controller 20 sets the operation mode into the normal mode in S206, and returns the process back to the main routine.

In connection with Embodiment 2, the above description is given of the case where the indoor heat exchanger through which refrigerant is to be passed in the oil retrieval mode is determined in advance, among a plurality of indoor heat exchangers. In connection with Modifications 1 and 2 of Embodiment 2, a description is given below of the case where an indoor heat exchanger through which refrigerant is to be passed is specified in real time at the timing at which the oil retrieval mode is performed.

Modification 1 of Embodiment 2

Figure 12:
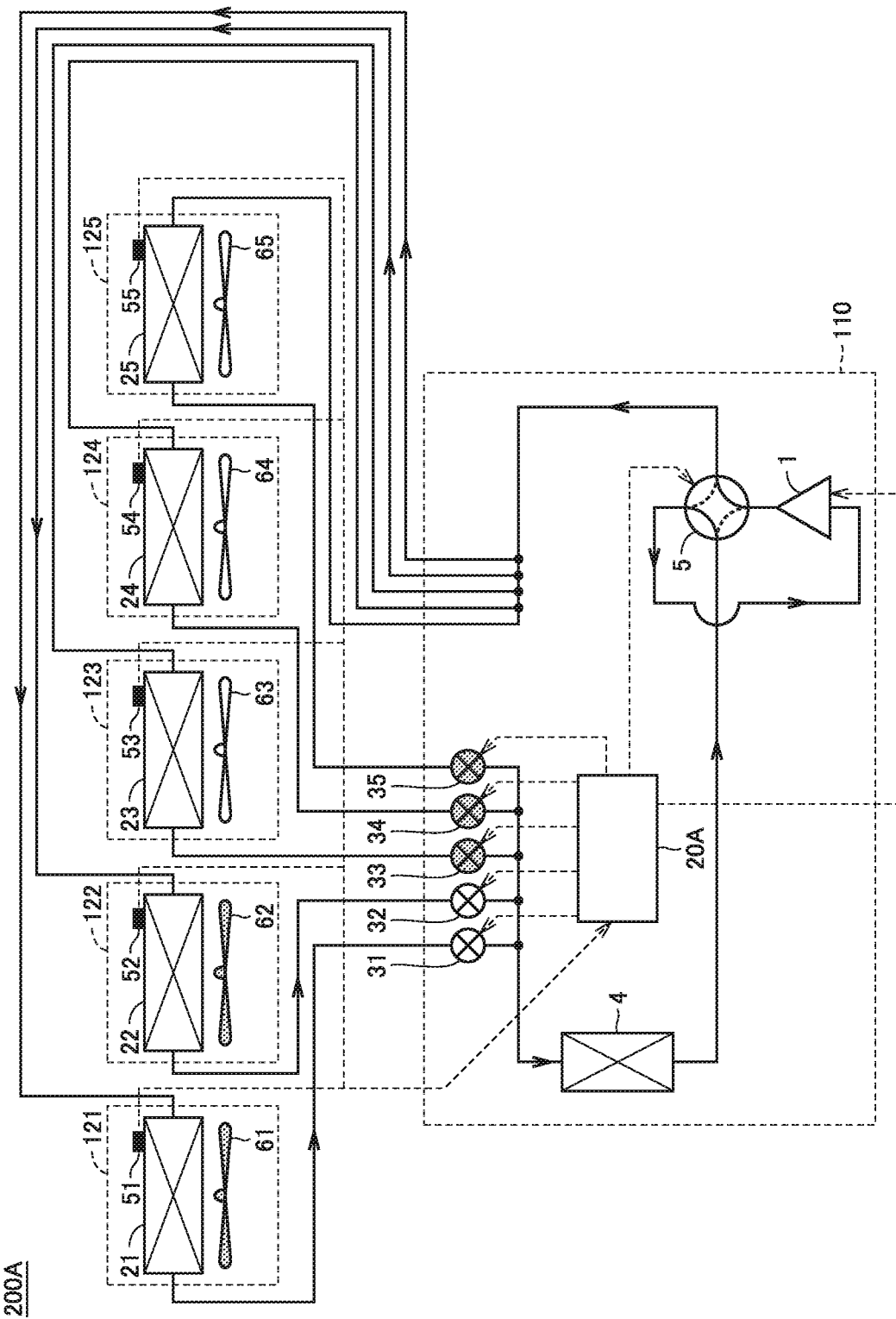
FIG. 12 is a functional block diagram showing a configuration of an air conditioner as an example of a refrigeration cycle apparatus according to Modification 1 of Embodiment 2.

FIG. 12 is a functional block diagram showing a configuration of an air conditioner 200A as an example of a refrigeration cycle apparatus according to Modification 1 of Embodiment 2. In FIG. 12, a flow of refrigerant in the oil retrieval mode is shown. The configuration of air conditioner 200A corresponds to the configuration in FIG. 5 in which controller 10A is replaced with controller 20A. Components other than this are similar to those in FIG. 5, and therefore, the description thereof is not herein repeated.

As shown in FIG. 12, controller 20A uses respective detected values of sensors 51 to 55 to identify a stopped indoor unit among indoor units 121 to 125, and opens the expansion valve that communicates with the identified indoor unit. In FIG. 12, it is determined that indoor units 121, 122 are stopped, and expansion valves 31, 32 that communicate respectively with indoor units 121, 122 are opened. In the oil retrieval mode, controller 20A closes the expansion valve that communicates with the operating indoor unit. In FIG. 12, expansion valves 33 to 35 that communicate respectively with operating indoor units 123 to 125 are closed. Controller 20A controls four-way valve 5 to set the refrigerant circulation direction to the first circulation direction.

In air conditioner 200A, the indoor heat exchanger that is to function as a condenser in the oil retrieval mode is limited to the indoor heat exchanger included in the stopped indoor unit. For the stopped indoor unit, a user does not request heating operation, and therefore, even when excessively warmed air is blown from this indoor unit, this goes against user's request only to a slight extent. Thus, degradation of comfort due to excessively warmed air blown from the indoor unit can be suppressed to a greater extent than Embodiment 2. If all the indoor units are operating in the oil retrieval mode, the indoor heat exchanger through with refrigerant is to be passed is limited to a predetermined indoor heat exchanger, similarly to Embodiment 1.

Figure 13:
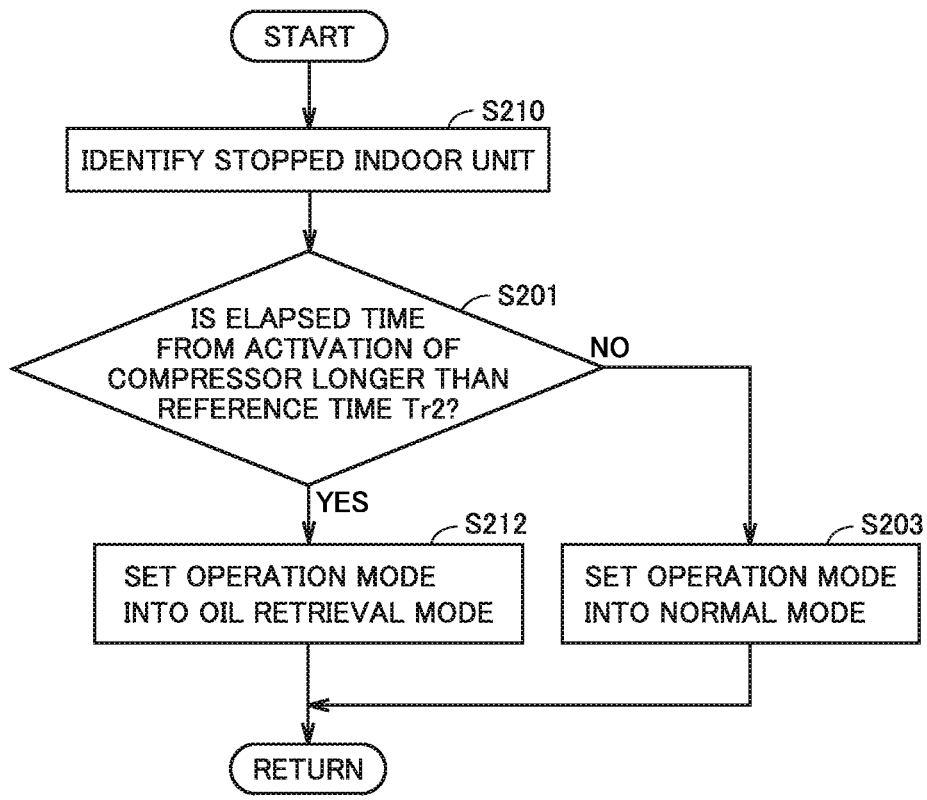
FIG. 13 is a flowchart showing a flow of an operation mode switching process performed by a controller in FIG. 12.

FIG. 13 is a flowchart showing a flow of an operation mode switching process performed by controller 20A in FIG. 12. The process shown in FIG. 12 is followed, for each sampling time, by a main routine (not shown) that exercises overall management of air conditioner 200A. The flowchart shown in FIG. 12 corresponds to the flowchart shown in FIG. 10 to which S210 is added and in which S202 is replaced with S212. Other steps are similar to those in FIG. 10, and therefore, the description thereof is not herein repeated.

As shown in FIG. 13, controller 20A identifies a stopped indoor unit among indoor units 121 to 125 in S210, and makes the process proceed to S201. Controller 20A makes the determination in S201, similarly to Embodiment 2. If NO in S201, controller 20A performs S203 similarly to Embodiment 2, and returns the process back to the main routine. If YES in S201, controller 20A sets the operation mode into the oil retrieval mode in S212, and returns the process back to the main routine. In S212, controller 20A opens the expansion valve that communicates with the stopped indoor unit, closes the expansion valve that communicates with the operating indoor unit, and sets the refrigerant circulation direction to the first circulation direction. S210 may be performed prior to S212, if YES in S201.

Modification 2 of Embodiment 2

Figure 14:
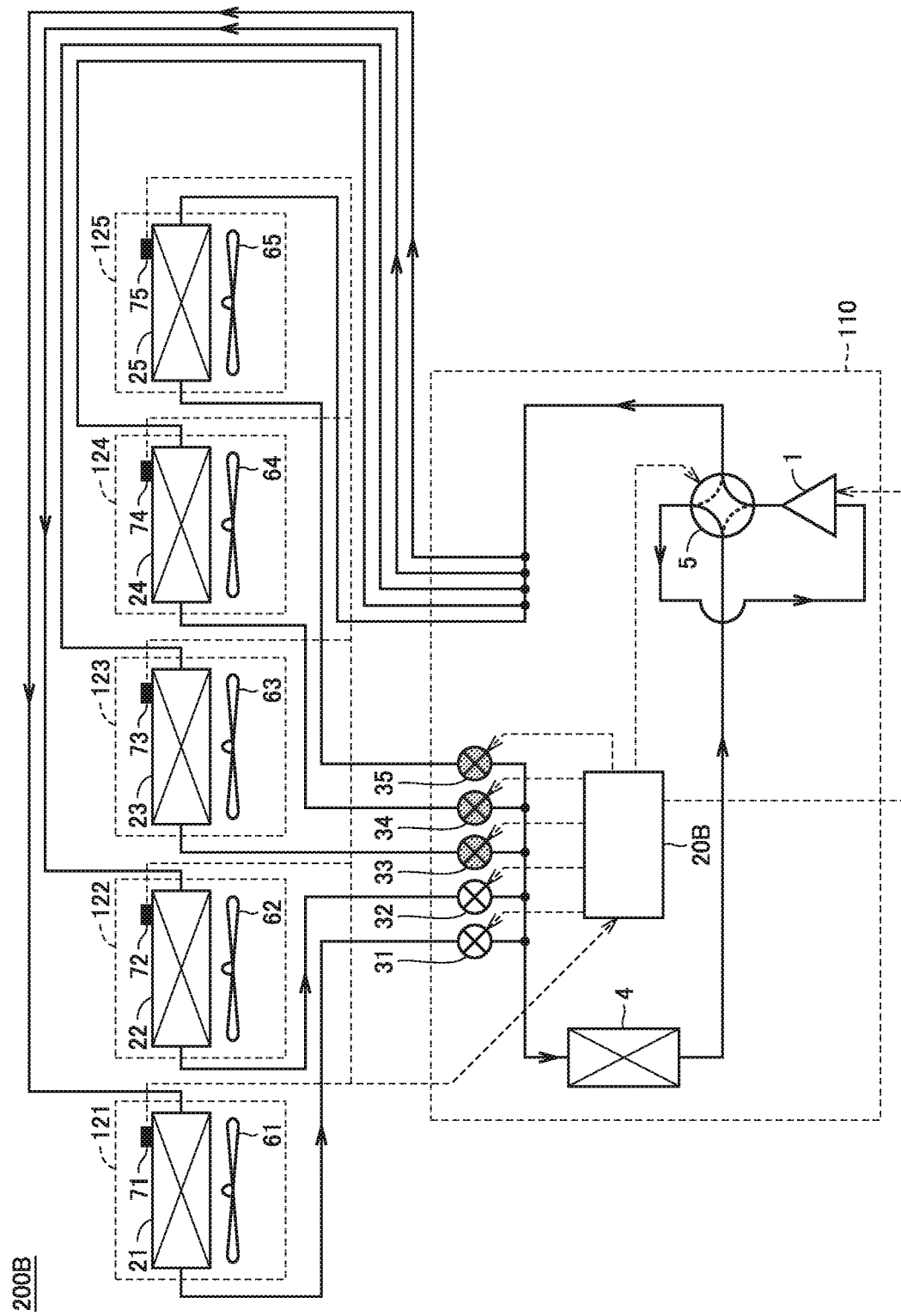
FIG. 14 is a functional block diagram showing a configuration of an air conditioner as an example of a refrigeration cycle apparatus according to Modification 2 of Embodiment 2.

FIG. 14 is a functional block diagram showing a configuration of an air conditioner 200B as an example of a refrigeration cycle apparatus according to Modification 2 of Embodiment 2. In FIG. 14, a flow of refrigerant in the oil retrieval mode is shown. The configuration of air conditioner 200B corresponds to the configuration in FIG. 7 in which controller 10B is replaced with controller 20B. Components other than this are similar to those in FIG. 7, and therefore, the description thereof is not herein repeated.

As shown in FIG. 14, controller 20B uses respective detected values of motion sensors 71 to 75 to identify an indoor unit around which no person is present, among indoor units 121 to 125, and opens the expansion valve that communicates with the identified indoor unit. In FIG. 14, it is determined that no person is present around indoor units 121, 122, and expansion valves 31, 32 that communicate respectively with indoor units 121, 122 are opened. Controller 20B closes the expansion valve that communicates with the indoor unit around which any person is present. In FIG. 14, it is determined that any person is present around each of indoor units 123 to 125, and expansion valves 33 to 35 that communicate respectively with indoor units 123 to 125 are closed. Controller 20B controls four-way valve 5 to set the refrigerant circulation direction to the first circulation direction.

In air conditioner 200B, the indoor heat exchanger that is to function as an evaporator in the oil retrieval mode is limited to the indoor heat exchanger included in the indoor unit around which no person is present. Even when excessively warmed air is blown from the indoor unit around which no person is present, sensing, by a user, of the temperature of the indoor space is hardly influenced. Thus, degradation of user's comfort due to excessively warmed air blown from the indoor unit can be suppressed to a greater extent than Embodiment 2. If any person is present around each of all the indoor units in the oil retrieval mode, the indoor heat exchanger through which refrigerant is to be passed is limited to a predetermined indoor heat exchanger, similarly to Embodiment 2.

Figure 15:
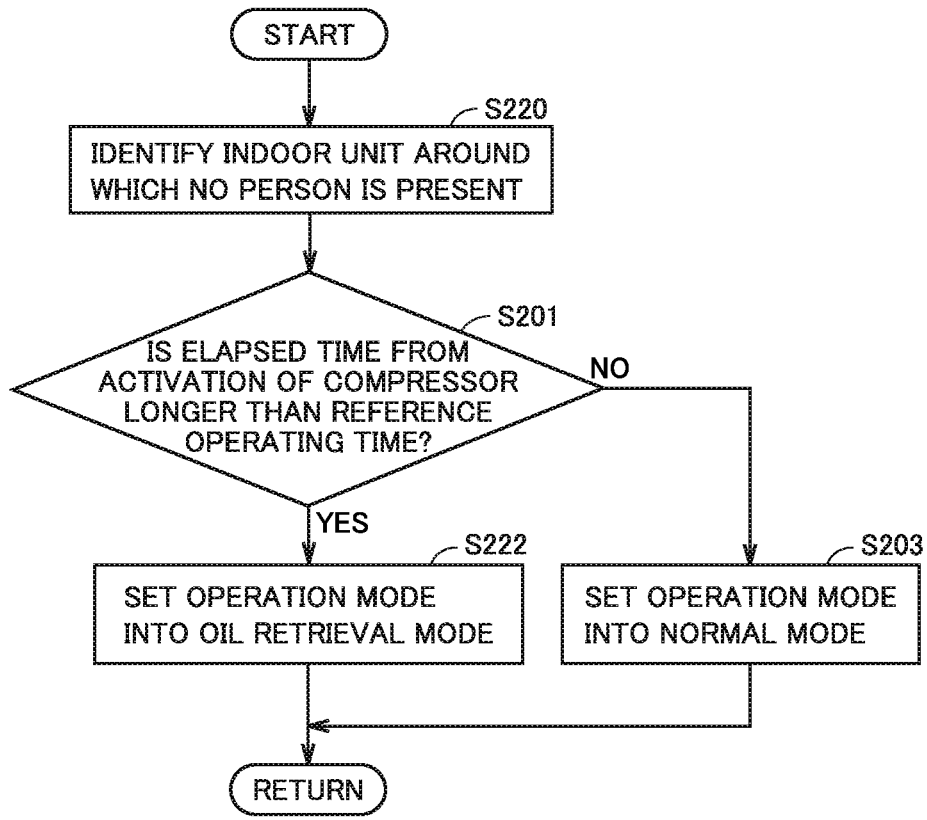
FIG. 15 is a flowchart showing a flow of an operation mode switching process performed by a controller in FIG. 14.

FIG. 15 is a flowchart showing a flow of an operation mode switching process performed by controller 20B in FIG. 14. The process shown in FIG. 15 is followed, for each sampling time, by a main routine (not shown) that exercises overall management of air conditioner 200B. The flowchart shown in FIG. 15 corresponds to the flowchart shown in FIG. 10 to which S220 is added and in which S202 is replaced with S222. Other steps are similar to those in FIG. 10, and therefore, the description thereof is not herein repeated.

As shown in FIG. 15, controller 20B identifies an indoor unit around which no person is present in S220, and makes the process proceed to S201. Controller 20B make the determination of S201 similarly to Embodiment 2. If NO in S201, controller 20B performs S203 similarly to Embodiment 2, and returns the process back to the main routine. If YES in S201, controller 20B sets the operation mode into the oil retrieval mode in S222, and returns the process back to the main routine. In S222, controller 20B opens the expansion valve that communicates with the indoor unit around which no person is present, closes the expansion valve that communicates with the indoor unit around which any person is present, and sets the refrigerant circulation direction to the first circulation direction. S220 may be performed prior to S222, if the determination in S201 is YES.

Thus, the refrigeration cycle apparatuses according to Embodiment 2 and Modifications 1 and 2 thereof can suppress degradation of user's comfort, while improving the stability of the refrigeration cycle apparatuses.

The embodiments disclosed herein are also intended to be implemented in an appropriate combination within the range where they are consistent with each other. It should be construed that the embodiments disclosed herein are given by way of illustration in all respects, not by way of limitation. It is intended that the scope of the present disclosure is defined by claims, not by the description above, and encompasses all modifications and variations equivalent in meaning and scope to the claims.

REFERENCE SIGNS LIST 1 compressor; 4 outdoor heat exchanger; 5 four-way valve; 10, 10A, 10B, 20, 20A, 20B controller; 11 circuitry; 12 memory; 13 input/output unit; 21-25 indoor heat exchanger; 31-35 expansion valve; 51-55 sensor; 61-65 fan; 71-75 motion sensor; 100, 100A, 100B, 200, 200A, 200B air conditioner; 110 outdoor unit; 121-125 indoor unit

The invention claimed is:
1. A refrigeration cycle apparatus in which refrigerant is circulated, the refrigeration cycle apparatus comprising:
    a compressor;
    a first heat exchanger;
    a second heat exchanger;
    a third heat exchanger;
    a first decompressor;
    a second decompressor;
    a flow path switch configured to selectively switch a circulation direction of the refrigerant between a first circulation direction and a second circulation direction opposite to the first circulation direction; and
    a controller configured to control the compressor, the first decompressor, the second decompressor, and the flow path switch, wherein
    in the first circulation direction, the refrigerant is circulated in order of the first heat exchanger, the compressor, the second heat exchanger, and the first decompressor, and circulated in order of the first heat exchanger, the compressor, the third heat exchanger, and the second decompressor, the controller is configured to identify a specific heat exchanger among the second heat exchanger and the third heat exchanger, and when an elapsed time from activation of the compressor is shorter than a first reference time, the controller is configured to
- identify, among the first decompressor and the second decompressor, a specific decompressor that communicates with the specific heat exchanger,
- control the first decompressor and the second decompressor such that an opening degree of the specific decompressor is larger than an opening degree of a decompressor that is among the first decompressor and the second decompressor and different from the specific decompressor, and
- set the circulation direction of the refrigerant to the second circulation direction, wherein when the elapsed time from activation of the compressor is longer than a second reference time, the controller is configured to
- increase a drive frequency of the compressor to be higher than a reference drive frequency, and
- control the first decompressor and the second decompressor such that an opening degree of the specific decompressor is larger than an opening degree of a decompressor that is among the first decompressor and the second decompressor and different from the specific decompressor, and set the circulation direction of the refrigerant to the first circulation direction.

2. The refrigeration cycle apparatus according to claim 1, further comprising:
- a first indoor unit including the second heat exchanger;
- a first sensor placed in the first indoor unit;
- a second indoor unit including the third heat exchanger; and
- a second sensor placed in the second indoor unit, wherein
- the controller is configured to identify the specific heat exchanger by using a detected value from each of the first sensor and the second sensor.

3. The refrigeration cycle apparatus according to claim 2, wherein
- the first sensor is configured to detect whether the first indoor unit is stopped or not,
- the second sensor is configured to detect whether the second indoor unit is stopped or not, and
- the specific heat exchanger is included in a stopped indoor unit, among the first indoor unit and the second indoor unit.

4. The refrigeration cycle apparatus according to claim 2, wherein
- the first sensor is configured to detect a person present around the first indoor unit,
- the second sensor is configured to detect a person present around the second indoor unit, and
- the specific heat exchanger is included in an indoor unit around which no person is present, among the first indoor unit and the second indoor unit.

* * * * *